UNITED STATES PATENT OFFICE.

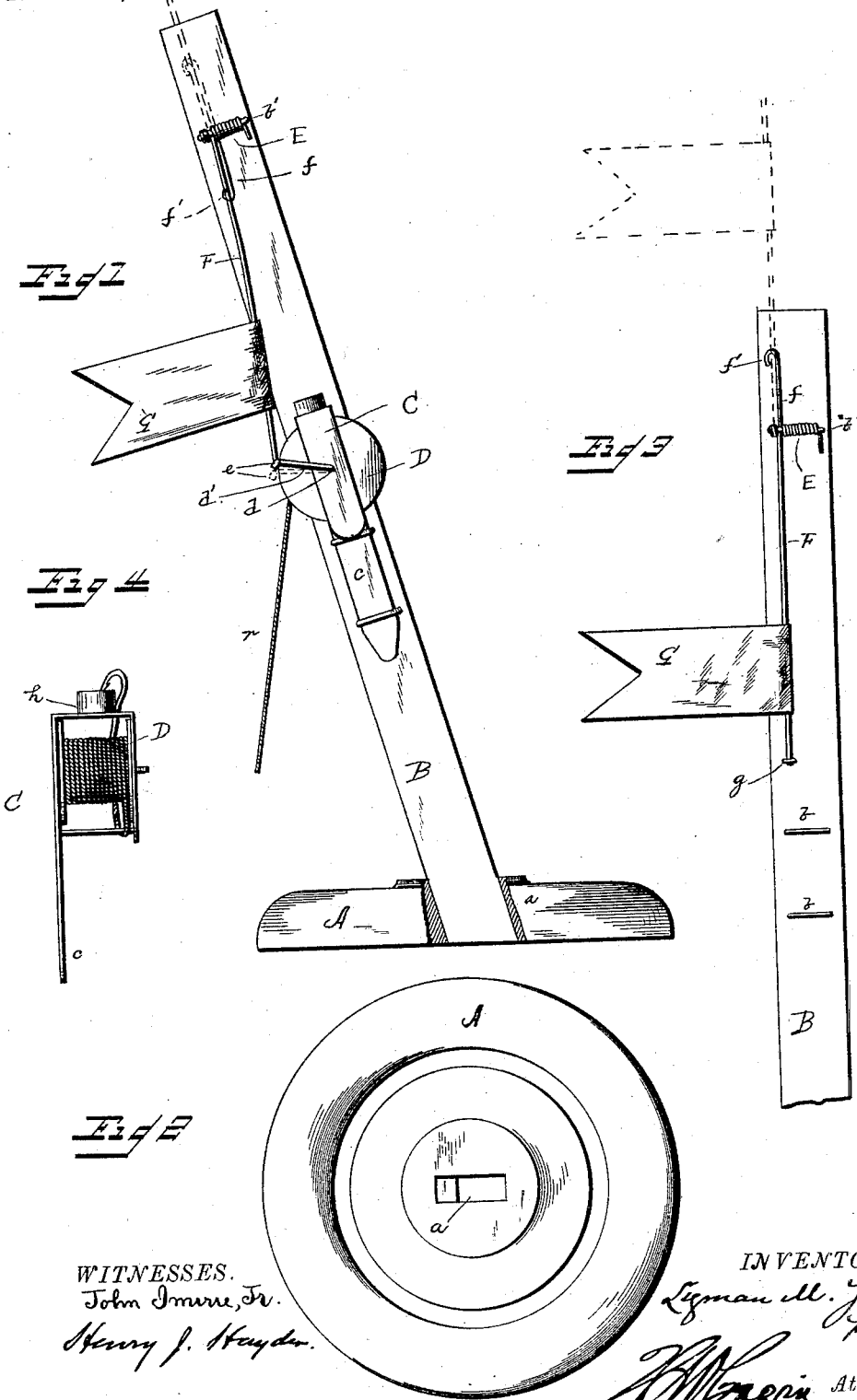

LYMAN M. JONES, OF JOHNSON, VERMONT.

FISHING-REEL SIGNAL.

SPECIFICATION forming part of Letters Patent No. 380,899, dated April 10, 1888.

Application filed February 23, 1888. Serial No. 264,961. (No model.)

*To all whom it may concern:*

Be it known that I, LYMAN M. JONES, a citizen of the United States, residing at Johnson, in the county of Lamoille and State of Vermont, have invented certain new and useful Improvements in Fishing-Reel Signals; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to provide improved compact means, in connection with a set-line fishing-reel, for giving a signal when fish take the hook; also for preventing the stoppage of line-play on account of freezing to the ice, all the parts being readily put together or taken apart.

The nature of the invention will be described below, and pointed out in the claims.

In the drawings, Figure 1 is a side elevation, the base partly broken away and the parts ready for operation. Figs. 2, 3, and 4 are detail views.

Like letters refer to like parts.

A is a suitable base, to rest on the ice. It has a socket, $a$, so formed as to incline the standard B, removably received therein, as that the fish-line will pass through the hole in the ice without touching it. Thus the line $r$ will not freeze to the ice and the fish will have sufficient play and not break away from the hook, as they often do from a rigid line.

B is the standard. It is provided with staples $b$, and as the reel-frame C has a somewhat long tongue, $c$, the reel D can be quickly put in place for operation or removed. The said frame C at a side view resembles a rectangle with one side extended to form the tongue $c$. The axle $d$ of the reel passes through the sides of the frame, one end being bent to form a handle, $d'$, terminating in a shoulder, $e$. At the top of the standard is another staple, $b'$, and about this is a coiled spring, E, the free end $f$ of which normally extends upward, ending in a loop, $f'$, the end $f$ exerting the force of the spring.

F is a separate piece of wire, one end of which is coiled somewhat loosely about staple $b'$ and at one side of spring E, so that wire F will move easily on the staple.

Near the free end of wire F is attached a colored flag, G, and when the said wire is not in use it is bent down and the end pushed under the small staple $g$ on the standard, (see Fig. 3,) this staple being hidden by the reel when in place.

The operation may be as follows: Release the wire F from staple $g$ and swing it up, bringing loop $f'$ over the wire. Pay off the line from the reel as far as desired and attach the reel-frame to the standard and that to the support. Bring down wire F, spring end, and loop $ff'$, and insert the free end of the wire lightly under shoulder $e$ of the reel-handle. As soon as a fish takes the hook the reel will move and shoulder $e$ will release flag-wire F, which will be carried up by spring end and loop $ff'$, the spring E being free to exert its full force, when the flag will be displayed. The line, being clear of the ice, cannot freeze to it; hence will give the fish all the play the friction of the reel allows, and there will be no jerking away from the hook; and there is nothing to prevent drawing in the line hand over hand when quick action is required. When operations are over, simply disconnect the removable parts, insert the end of the flag-wire in staple $g$, and stick the hook in cork $h$ on the reel-frame. Of course each person may vary the above operation as suits him.

It will be seen that the device is simple in construction and operation, and that when disconnected several of them can be carried about with no inconvenience.

Having fully described my invention, what I claim, and desire to secure by Letters Patent, is—

1. The combination, with the base, of the standard having at its upper end a spring terminating in a free looped end, the movable flag-wire non-integral with said spring, the reel-frame, and the reel, the handle of which is adapted to hold and release the flag-wire, substantially as shown, after the said wire has been drawn down, as set forth.

2. The combination, with the removable base having an inclined socket, of the inclined removable standard, the flag-wire, the removable reel-frame, the reel having a handle adapted to hold and release the flag-wire, and a spring attached to the staple on the upper end of the standard, and having a free end adapted to throw up the flag-wire when it is released by the reel-handle, as set forth.

3. The combination, with the standard having staple $b'$ at its upper end and small lock-staple $g$ about midway, of the movable flag-wire turning on staple $b'$, whereby the flag-wire may be brought down and held when not in use, as set forth.

4. The combination, with the base, of the standard provided with staple $b'$ at its upper end, the spring E, secured about said staple and having a free looped end, $f f'$, the flag-wire, the reel-frame, and the reel having a handle, $d'$, terminating in a shoulder, $e$, as set forth.

In testimony whereof I affix my signature in presence of two witnesses.

LYMAN M. JONES.

Witnesses:
E. P. CARPENTER,
BERTRON A. HUNT.